United States Patent Office 3,332,987
Patented July 25, 1967

---

3,332,987
AMINOALKYLPHOSPHINIC ACIDS
Ivan C. Popoff, Ambler, Burton Peter Block, Wayne, and Ludwig K. Huber, Philadelphia, Pa., assignors to Pennsalt Chemicals Corporation, Philadelphia, Pa., a corporation of Pennsylvania
No Drawing. Filed June 24, 1963, Ser. No. 290,234
3 Claims. (Cl. 260—500)

This invention relates to novel phosphine oxides and phosphinic acids having the structure

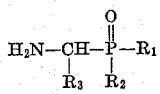

where $R_1$ is a hydrocarbon containing from one to ten carbon atoms selected from the group consisting of alkyl and aryl, $R_2$ is a member selected from the group consisting of hydroxyl, alkyl and aryl containing from one to ten carbon atoms, and $R_3$ is a member of the group consisting of hydrogen and lower alkyl. The compounds of this invention are useful chelating agents.

When $R_2$ in the above formula is alkyl or aryl as defined, the compound is an α-aminoalkylphosphine oxide. On the other hand, when $R_2$ is hydroxyl, the compound is an α-aminoalkylphosphinic acid. Both the phosphine oxides and phosphinic acids of the invention are prepared by hydrolysis of the corresponding phthalimidomethylphosphine oxides and phosphinates, which compounds have the structure

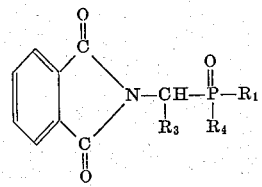

where $R_1$ and $R_3$ are as defined above for the compounds of this invention and $R_4$ is selected from the group consisting of hydroxy, alkyl, aryl, alkoxy and aryloxy containing from one to ten carbon atoms. These phthalimidomethyl phosphorus compounds are the subject matter of Serial No. 290,245 filed of even date herewith and now U.S. Patent No. 3,222,378.

The intermediate phthalimidoalkyl compounds of the invention where $R_3$ is hydrogen are prepared by reaction of an N-bromomethylphthalimide with the appropriate phosphinite or phosphonite whereby an alkyl bromide is eliminated. Thus, for example, the N-bromomethylphthalimide may be heated with an alkyl phosphinite without a solvent or in an organic solvent system such as xylene, toluene, etc. to obtain a reaction as follows:

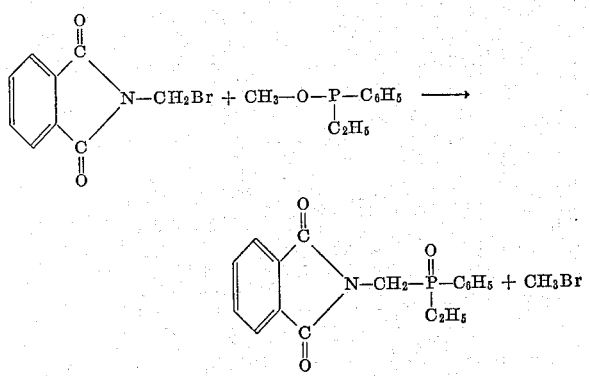

When $R_3$ of the phthalimidoalkyl compound is a lower alkyl such as methyl, ethyl, propyl and butyl, the intermediate phthalimidoalkyl compound is prepared by reaction of a phosphonite or phosphinite with an N(α-haloalkyl)phthalimide, viz:

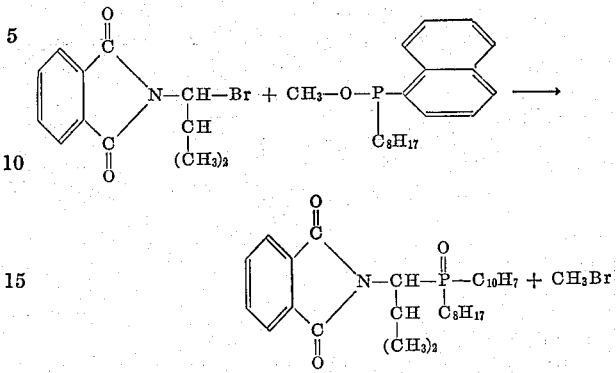

Appropriate phosphinites useful for making the phthalimidoalkylphosphine oxide intermediates will include methyl methyl(phenyl)phosphinite, butyl butyl(phenyl)-phosphinite, methyl dinaphthylphosphinite, methyl naphthyloctylphosphinite, methyl naphthylphenylphosphinite, methyl didecylphosphinite, and the like. As indicated, instead of using a phosphinite to react with the N-α-haloalkylphthalimide, a phosphonite may be used to obtain phosphinates. Appropriate phosphonites may be prepared in accordance with the procedure of G. Kamai; Zhur. Obshchei. Khim., vol. 18, p. 443 (1948), and will include such compounds as dimethyl phenylphosphonite, diethyl phenylphosphonite, dibutyl phenylphosphonite, methyl phenyl phenylphosphonite, diethyl naphthylphosphonite, dimethyl octylphosphonite, and the like. As indicated, the preparation of the intermediate phthalimidoalkyl phosphorus compound is carried out by reaction of the N-α-haloalkylphthalimide with the appropriate phosphorus compounds by heating the reactants and removing the alkyl bromide formed. The general procedure for this reaction involves contacting essentially stoichiometric amounts of the reagents under nitrogen with or without a solvent medium, at atmospheric or reduced pressures and at temperatures on the order of about 0° to 20° C. higher than the temperature at which the alkyl halide by-product begins to form. As the reaction proceeds the alkyl halide by-product is removed from the reaction zone, preferably by applying vacuum, and if desired, this by-product may be condensed in a Dry Ice trap. The vacuum applied will vary considerably depending upon the volatility of the alkyl halide, but will normally be in the order of 300 to 500 mm. When the alkyl halide is no longer generated, it is assumed that the reaction is complete and heating may be discontinued shortly thereafter. The proudct in the reaction flask is the phthalimidoalkyl phosphorus compound and may be purified by crystallization or distillation in accordance with normal procedures. To obtain the aminoalkyl compound of this invention, the phthalimidoalkyl phosphorus compounds are hydrolyzed with a mineral acid, preferably by using an excess of aqueous HBr, and the hydrolysis is carried out at a temperature of about 65 to 130° C. When the hydrolysis is carried out with a phthalimidomethyl phosphinate, both the phthaloyl group and the alkoxy group (i.e., $R_2$) are hydrolyzed, although the alkoxy group is hydrolyzed first.

The products of the invention are colorless crystalline materials with sharp melting points when pure. The phosphine oxides of the invention are soluble in organic solvents such as ketones (acetone), aromatic hydrocarbons (benzene, toluene, etc.), alcohols (ethanol, methanol, etc.) and water, and also show some slight solubility in hot aliphatic hydrocarbons, such as n-hexane. The phosphinic acids of the invention are likewise solid, colorless, crystalline materials and are generally insoluble in organic solvents such as benzene, ethanol and n-hexane. On the other hand, the phosphinic acids show solubility in water and in aqueous solution have an acid reaction.

The following examples will serve to more fully illustrate the invention.

EXAMPLE 1

*Diphenyl(phthalimidomethyl)phosphine oxide* is obtained by reaction of equimolar amounts of N-bromomethylphthalimide and methyl diphenylphosphinite in xylene. The reaction mixture is refluxed at atmospheric pressure for 7 hours under a stream of nitrogen and 92% of the methyl bromide is collected in a Dry Ice trap. In this way, 88.6% of the crude product precipitates and is recrystallized from dioxane. The product is soluble in acetone and ethanol, insoluble in benzene, ether, n-hexane, water and xylene, and melts at 206–206.5° C. Found: 69.31% C, 4.18% H, 3.85% N and 8.64% P; calculated for $C_{21}H_{16}NO_3P$: 69.80% C, 4.43% H, 3.88% N and 8.60% P.

*Aminomethyl(diphenyl)phosphine oxide* having the structure

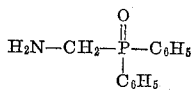

is obtained by the hydrolysis of diphenyl(phthalimidomethyl)phosphine oxide with 48% aqueous HBr, which is achieved by refluxing for 10 hours. The mass is then filtered to remove phthalic acid and the filtrate is evaporated. The residue containing the crude hydrobromide is dissolved in water and, after addition of an excess of sodium carbonate, is evaporated to dryness. The completely dry evaporation residue is extracted with n-hexane in a Soxhlet to recover the pure product melting at 101.5–102.5° C. The product is very hygroscopic, soluble in acetone, benzene, ethanol and water and slightly soluble in hot n-hexane. It can be sublimed at about 100° C. bath temperature under reduced pressure of 0.05 mm. The infrared spectrum of the product confirms the presence of $-NH_2$, $P{\rightarrow}O$, and $P-C_6H_5$ bonds. Found: 67.54% C, 6.23% H, 5.40% N, and 13.38% P; calculated for $C_{13}H_{14}NOP$: 67.50% C, 6.15% H, 6.06% N and 13.38% P.

EXAMPLE 2

*Ethyl phenyl(phthalimidomethyl)phosphinate* is prepared by adding N-bromomethylphthalimide to diethyl phenylphosphonite in xylene. The addition lasts 6 hours while refluxing at reduced pressure of about 300 mm. The by-product, ethyl bromide, is collected in 93.5% yield. The reaction mixture is cooled at 5° C. and filtered to isolate 98% of crude product melting at 105–109° C. The pure product, melting at 111–113° C., is obtained in 86% yield by recrystallization from a 1:1 mixture of benzene and n-hexane. It is soluble in acetone, benzene, and ethanol, and insoluble in n-hexane and water. Found: 62.00% C, 4.86% H, 4.25% N and 9.43% P; calculated for $C_{17}H_{16}NO_4P$: 61.99% C, 4.33% H, 4.48% N and 9.54% P.

*Aminomethyl(phenyl)phosphinic acid* was prepared in accordance with the details of Example 1 by the hydrolysis of ethyl phenyl(phthalimidomethyl)phosphinate with aqueous HBr. The solid evaporation residue of the hydrolysis reaction mixture has a melting point of 183–190° C. (with HBr evolution). Analysis of the residue indicates 30.54% Br for the amine hydrobromide. Calculated value for the amine hydrobromide is 31.7% Br. The residue is refluxed for 30 hours in alcohol containing aniline an amount equivalent to the HBr content. The solid filtered off at about 20° C. to obtain 95% crude product (M.P. 265–268° C.) and is purified by recrystallization from 75% aqueous ethanol. The pure aminomethyl-(phenyl)phosphinic acid (80% yield) has a melting point of 285.5–286.5° C. (decomposition) and is insoluble in benzene, ethanol and n-hexane. Its 0.01 molar aqueous solution has a pH of 4.5. Its infrared spectrum shows absorptions for $P{\rightarrow}O$, $P-C_6H_5$, $P-OH$ and $-NH_2$ and strong H-bonding due to inner salt formation. Found: 49.10% C, 5.83% H, 8.30% N and 17.70% P; calculated for $C_7H_{10}NO_2P$: 49.06% C, 5.85% H, 8.18% N and 18.10% P.

EXAMPLE 3

α-*Aminoethyl(phenyl)phosphinic acid* of structure

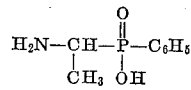

is obtained by reaction of dimethyl phenylphosphonite with N(α-chloroethyl)phthalimide and subsequent hydrolysis of the intermediate without isolation. The formation of methyl chloride is noticed at 110° C. and the reaction is carried out at 115° C. 80% of the theoretical amount of methyl chloride is collected indicating the formation of methyl α-phthalimidoethyl(phenyl)phosphinate. The crude reaction mixture is hydrolyzed with 48% aqueous HBr. The viscous evaporation residue of the hydrolysis is refluxed with acetone containing equimolar amounts of aniline (based on theoretical yield). A solid precipitates and is repeatedly recrystallized from 95% aqueous ethanol to yield the pure α-aminoethyl(phenyl)phosphinic acid melting at 265° C. The product is soluble in water and insoluble in acetone, benzene, ether and n-hexane; its infrared spectrum shows absorptions for $P-C_6H_5$, $P-OH$, $P{\rightarrow}O$, $-NH_2$ and strong H-bonding due to inner salt formation. Its 0.01 molar aqueous solution has a pH of 4.6. Found: 51.35% C, 6.24% H, 7.75% N and 16.24% P; calculated for $C_8H_{12}NO_2P$: 51.89% C, 6.54% H, 7.76% N and 16.73% P.

EXAMPLE 4

Hydrolysis and work-up in accordance with the details of Example 2 of methyl phenyl(phthalimidomethyl)phosphinate and phenyl(phthalimidomethyl)phosphinic acid result in excellent yields of aminomethyl(phenyl)phosphinic acid.

EXAMPLE 5

Ethyl methyl(phthalimidomethyl)phosphinate is prepared by reaction of diethyl methylphosphonite with N-bromomethylphthalimide in xylene. The reaction mixture is kept for 4 hours at 70–80° C. at reduced pressure of about 300 mm. and 99% of the theoretical ethyl bromide is collected. Upon filtration at 10° C., 99% of the crude product, M.P. 99–105° C., is obtained and is recrystallized from a 1:1 mixture of benzene and n-hexane to recover 92% of ethyl methyl(phthalimidomethyl)phosphinate melting at 109–111° C. It is soluble in acetone, carbon tetrachloride, ethanol, ether and methanol and insoluble in n-hexane. Its infrared spectrum confirms the presence of $P{\rightarrow}O$, $P-O-C$ and $-C(O)N{<}$. Found: 53.40% C, 4.78% H, 5.05% N and 11.20% P; calculated for $C_{12}H_{14}NO_4P$: 53.93% C, 5.28% H, 5.24% N and 11.59% P. Hydrolysis with aqueous HBr as in Example 1 results in excellent yields of aminomethyl(methyl)phosphinic acid which, when crystallized from 66% ethanol, melts at 296–298° C. and is soluble in water and methanol and slightly soluble in ethanol, and insoluble in benzene. Its 0.01 molar aqueous solution has a pH of 4.8. Analysis: Found: 22.00% C, 6.80% H, 12.71% N, 28.28% P; calculated for $C_2H_8NO_2P$: 22.02% C, 7.39% H, 12.84% N and 28.41% P.

EXAMPLE 6

When dioctyl(phthalimidomethyl)phosphine oxide is hydrolyzed with aqueous HBr, aminomethyl(dioctyl)phosphine oxide is obtained in excellent yield.

EXAMPLE 7

Hydrolysis of dimethyl(phthalimidomethyl)phosphine oxide yields aminomethyl(dimethyl)phosphine oxide.

EXAMPLE 8

Hydrolysis of methyl(phenyl)(phthalimidomethyl)phosphine oxide yields aminomethyl(methylphenyl)phosphine oxide.

The chelating properties of the compounds of this invention are exemplified by the following:

A solution of 1.1 g. of $Zn(OCOCH_3)_2 \cdot 2H_2O$ in 5 ml. of water was added to a solution of 1.87 g. of $$NH_2CH_2P(O)(OH)C_6H_5$$

in 10 ml. of water. The addition of ethyl alcohol precipitated a white solid. The solid was washed with ethyl alcohol and dried; it weighed 0.77 g. and melted at 325° C. Chemical analysis and infrared spectral analysis of this compound clearly show that it is a chelate formulated as follows:

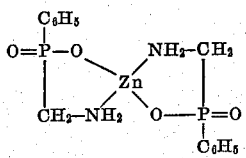

This chelate is stable to 330° C. on the thermobalance which is substantially better thermal stability than that exhibited by $Zn(CH_3COCHCOCH_2)_3$ which decomposes at 191° C. Thus the aminomethyl(phenyl)phosphinic acid is a ligand used for making coordination compounds having increased thermal stability. Such chelating compounds are also of value for chemical analysis of coordinating metals.

In similar manner, when dioxane is added to a solution of 2 g. of $Zn(OCOCH_3)_2 \cdot 2H_2O$ and 2.0 g. of $NH_2CH_2P(O)(OH)CH_3$ in aqueous alcohol, the chelate $ZN[O_2P(CH_3)CH_2NH_2]_2$ is precipitated.

It will be understood that numerous changes and variations may be made from the above description and examples without departing from the spirit and scope of the invention.

We claim:

1. Compounds having the structure

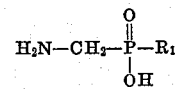

where $R_1$ is an alkyl group containing from 1 to 10 carbon atoms.

2. Aminomethyl(methyl)phosphinic acid.
3. Aminomethyl(ethyl)phosphinic acid.

References Cited

Kabachnik et al., "Chem. Abstracts," vol. 50 (1956) p. 219.

LEON ZITVER, *Primary Examiner.*

J. E. EVANS, *Assistant Examiner.*